Patented Feb. 28, 1939

2,148,593

UNITED STATES PATENT OFFICE 2,148,593

METHOD OF PLASTICIZING CHEESE, PRODUCT, AND PLASTICIZING AGENT

George L. Teller and W Kedzie Teller, Chicago, Ill., assignors to Henry H. Doering, Chicago, Ill.

No Drawing. Application December 12, 1935,
Serial No. 54,065

10 Claims. (Cl. 99—162)

This invention relates to cheese plasticizing substances and the method of processing cheese therewith, but more particularly to emulsifiers utilized in the processing of cheese.

It contemplates more especially the provision of a new cheese plasticizing agent that is an acid salt rather than an alkaline substance that have heretofore been largely, if not entirely, thought necessary for plasticizing or emulsifying cheese during the pasteurization thereof in the production of the so called "process cheese".

This processing consists in the subjection of cheese to heat of sufficiently high temperature to destroy undesirable bacteria, but not sufficiently high to disintegrate the cheese into its component elements of casein and olein. This treatment usually prescribes that the cheese is kept at a temperature from about 140° F. to 175° F. for a short duration of time during which the cheese is actively stirred. Another process prescribes the subjection of the cheese to a friction pressure reaction which develops heat of pasteurization incident to the frictional reaction on the casein constituent of the cheese. Irrespective of the method of processing, however, the desired resultant is the pasteurization of the cheese, greatly reducing its tendency to deteriorate and, further, to improve the texture, body, slicing qualities and appearance of the cheese.

In some cases different kinds of cheese are blended during the processing to impart improved flavor and more uniform and homogeneous texture as well as keeping qualities. Also, in the case of Camembert, brick and other cheese of extremely soft consistency, it is advantageous to blend a firmer cheese with the soft cheese to obtain a cheese of firmer body which can be more effectively emulsified, packed, sliced and processed for marketing purposes.

In the processing of cheese by one process or another, the cheese is reduced to a plastic state approaching liquidity, and then poured into containers for storage and marketing. During the pasteurizing treatment, the fat constituent of the cheese has a tendency to become separated from the casein, thereby disintegrating the product and impairing the desired texture thereof in its normal state. This tendency has heretofore been overcome by constantly stirring the cheese and incorporating therein a small amount of an alkaline emulsifying salt. In this manner, a pasteurized cheese product is produced with uniform and homogeneous texture.

Alkaline and neutral salts have been commonly used as emulsifying agents for this purpose. Such alkaline and neutral salts have largely, if not entirely, been heretofore regarded as only satisfactory for this purpose. It has long been known in scientific literature that alkaline substances are solvents for casein. Since the emulsification of cheese involves the plasticizing or rendering soluble the casein constituent of cheese so that the olein or fat thereof will be miscible therewith, any number of alkaline substances have been known to give satisfactory results.

We have discovered, however, that certain acid salts, especially an acid salt of citric acid and more especially a dibasic acid salt such as diammonium citrate is unusually efficacious and particularly suited for use as emulsifying or plasticizing agents in the processing of cheese. Other acid salts of citric acid or dibasic salts having an acid reaction may be used for this purpose. Heretofore, acids have generally been thought undesirable in the processing of cheese and, in fact, a virtual impossibility according to the generally accepted chemical theory that casein is not soluble to any appreciable or practical degree in the presence of an acid or when cheese has an acid reaction.

When a dibasic salt of a tribasic acid such as diammonium citrate is used in the processing of cheese, emulsification of the casein constituent of the cheese takes place. This is accomplished with the diammonium citrate addition and, if more body is desired in the resultant cheese product, it can be intermixed with a caseinate such as sodium caseinate. It is not believed that the sodium caseinate reacts chemically with the plasticizing agent, but serves to control the body of the cheese. For instance, during the summer months there is a distinct advantage in the addition of a caseinate, for there is a requirement for increased body to retain the cheese in a more firm mass possessing good slicing qualities at summer temperatures. This latter function is entirely independent of the emulsification or plasticizing action of the acid salts of citric acid preferably diammonium citrate which has been found to have a very passive influence upon the natural cheese taste.

In fact, acid salts of citric acid provide the cheese with a flavor more identical to that of natural cheese which is not true in cheese processed with the alkaline phosphates, tartrates, citrates, gluconates and the like as emulsifying agents. The acid salts of citric acid are especially suited for use as plasticizing agents in processing of cheese because they are responsible for a more stable emulsion of olein and casein in the cheese and, consequently, a better texture in the finished product and wider range of selection of cheese which may be blended to a uniform composite process cheese. Then, too, another advantage of using citric acid or an acid salt of citric acid, is that the cheese can be subjected to a higher temperature than is possible with the use of any of the above mentioned alkaline or neutral salt emulsifiers such as sodium citrate. This provides for a more thorough pasteurizing effect upon the cheese and as an aid in imparting a better body and firmer texture thereto.

The proportion of a diammonium citrate to cheese where it is alone used as the sole plasticizing agent, may vary from one per cent (1.0%) to two per cent (2.0%) by weight of the cheese. More specifically, 1¾% of diammonium citrate, by weight, has been found very desirable with most cheese. When a caseinate is admixed with the plasticizing agent or separately incorporated in the cheese, about one-half of the above quantity of diammonium citrate and .875% of the sodium caseinate are utilized. Consequently, the proportion of citric acid, an acid salt of citric acid or suitable acid dibasic salts to be used in any particular case can readily be determined by the requirements for producing the desired body, firm texture and slicing qualities which are important factors in process cheese. The quantity of the plasticizing agent will also be a factor of the cheese to be processed as to its original alkaline or acidity and the pH value is to be adjusted through the acid value of the plasticizing agent.

Diammonium citrate $(NH_4)_2H(C_6H_5O_7)$ is an acid dibasic salt. It is unlike sodium citrate $Na_3C_6H_5O_7.2H_2O$ which is an alkaline tribasic salt. Comparing these chemically as to pH and their reaction to litmus, it is found that:

|  | Commercial sodium citrate | Diammonium citrate |
| --- | --- | --- |
| pH of 10% solution | 7.50–7.8 | 3.90 |
| Reaction to litmus | Slightly alkaline | Strongly acid |

One hundred pound batches of cheese processed from identical blends using one case sodium citrate and in the other case diammonium citrate disclosed the following reactions:

|  | pH |
| --- | --- |
| White America before processing | 4.99 |
| White America processed with diammonium citrate | 4.55 |
| White American processed with sodium citrate | 5.15 |
| Swiss cheese before processing | 5.48 |
| Swiss cheese processed with dimmonium citrate | 4.91 |
| Swiss cheese processed with sodium citrate | 5.62 |

The diammonium citrate process cheese was firm and unmolded after standing cut, but boxed at room temperature for two weeks.

The sodium citrate process cheese was softened, sagging and badly molded after standing cut, but boxed at room temperature for two weeks.

The diammonium citrate cheese had a distinct snappy flavor while the sodium citrate cheese was very bland—almost devoid of cheese flavor.

The following procedure for preparing the diammonium citrate cheese plasticizing agent may be utilized:

| Citric acid (U. S. P. crystals) | 37½ pounds |
| --- | --- |
| Ammonia 26° | 211 lbs. 11 ozs. |
| Water | 52½ pounds |

Weigh the ammonia accurately into a tank or crock of 15–20 gallon capacity.

Add the water and then the citric acid. Keep covered until the acid is all dissolved.

For 100 pounds cheese use either 4½ pounds of this solution or 2¼ pounds and an equal amount of sodium caseinate. If 4½ pounds are used 3 pounds of water is added. If 2¼ pounds are used, 1½ pounds of water is added. Of course, the moisture must be controlled to conform with the requirements and limitations of the pure food laws respecting process cheese.

Various changes may be made in the embodiment of the invention herein specifically described without departing from or sacrificing any of the advantages of the invention as defined in the appended claims.

We claim:—

1. A product of manufacture comprising cheese plasticized with diammonium citrate having an acid reaction to litmus to provide an emulsified cheese product.

2. A cheese plasticizing agent comprising an edible dibasic salt of citric acid having an acid reaction to litmus and a caseinate admixed therewith.

3. A cheese plasticizing agent containing an edible acid salt of citric acid and a caseinate admixed therewith.

4. A cheese plasticizing agent comprising diammonium citrate and a caseinate admixed therewith.

5. A cheese plasticizing agent containing an edible citric acid salt having an acid reaction to litmus and a caseinate admixed therewith.

6. A method of processing cheese which consists in adding to cheese a small amount of an edible dibasic salt of citric acid, heating the mass to a temperature that is sufficiently high to effect pasteurization but not sufficiently high to disintegrate the cheese, and then pouring the cheese in containers of predetermined size for storage and marketing.

7. A method of processing cheese which consists in adding to cheese a small amount of an edible acid salt of citric acid, heating the mass to a temperature that is sufficiently high to effect pasteurization but not sufficiently high to disintegrate the cheese, and then pouring the cheese in containers of predetermined size for storage and marketing.

8. A method of processing cheese which consists in adding to cheese a small amount of diammonium citrate, heating the mass to a temperature that is sufficiently high to effect pasteurization but not sufficiently high to disintegrate the cheese, and then pouring the cheese in containers of predetermined size for storage and marketing.

9. A method of processing cheese which consists in adding to cheese a small amount of an edible citric acid salt having an acid reaction to litmus, heating the mass to a temperature that is sufficiently high to effect pasterization but not sufficiently high to disintegrate the cheese, and then pouring the cheese in containers of predetermined size for storage and marketing.

10. A method of processing cheese which consists in adding to cheese a small amount of an edible acid salt of citric acid and a caseinate, heating the mass to a temperature that is sufficiently high to effect pasteurization but not sufficiently high to disintegrate the cheese, and then pouring the cheese in containers of predetermined size for storage and marketing.

GEORGE L. TELLER.
W KEDZIE TELLER.